US011447293B2

(12) United States Patent
Sideris

(10) Patent No.: US 11,447,293 B2
(45) Date of Patent: Sep. 20, 2022

(54) STACKABLE HOLLOW PLASTIC CONTAINER

(71) Applicant: IPET TECHNOLOGIES LTD., Dali (CY)

(72) Inventor: Constantinos Sideris, Strovolos (CY)

(73) Assignee: IPET TECHNOLOGIES LTD., Dali (CY)

( * ) Notice: Subject to any disclaimer, the term of this patent is extended or adjusted under 35 U.S.C. 154(b) by 315 days.

(21) Appl. No.: 16/488,795

(22) PCT Filed: Feb. 28, 2018

(86) PCT No.: PCT/EP2018/054952
§ 371 (c)(1),
(2) Date: Aug. 26, 2019

(87) PCT Pub. No.: WO2018/158326
PCT Pub. Date: Sep. 7, 2018

(65) Prior Publication Data
US 2020/0031525 A1    Jan. 30, 2020

(30) Foreign Application Priority Data

Feb. 28, 2017  (GB) ..................................... 1703164
May 19, 2017  (GB) ..................................... 1708093

(51) Int. Cl.
*B65D 21/02* (2006.01)
*B29C 49/06* (2006.01)
(Continued)

(52) U.S. Cl.
CPC .......... *B65D 21/0212* (2013.01); *B29C 49/06* (2013.01); *B29C 49/071* (2022.05);
(Continued)

(58) Field of Classification Search
CPC .......... B65D 15/02; B65D 11/06; B65D 7/42; B65D 7/045; B65D 21/0212;
(Continued)

(56) References Cited

U.S. PATENT DOCUMENTS 3,780,899 A * 12/1973 Roper ................ B65D 21/0222
220/4.04
4,311,238 A *  1/1982 Smith ................ B65D 21/0222
206/508
(Continued)

FOREIGN PATENT DOCUMENTS

CN       1203548 A    12/1998
CN     102245366 A    11/2011
(Continued)

OTHER PUBLICATIONS

PCT International Search Report and Written Opinion, PCT/EP2018/054952, dated May 14, 2018, 12 pages.
(Continued)

*Primary Examiner* — Kareen K Thomas
(74) *Attorney, Agent, or Firm* — Quarles & Brady LLP

(57) ABSTRACT

A stackable plastic container includes a neck area; a body portion with a base; an integral handle part located around the neck area of the container, in which the handle part includes one or more handles for carrying and handling the container; and an integral first chime configured to receive and/or cooperatively engage the base of an identical container.

14 Claims, 4 Drawing Sheets

(51) Int. Cl.
  *B65D 1/02* (2006.01)
  *B65D 23/10* (2006.01)
  *B29C 49/00* (2006.01)
  *B29K 67/00* (2006.01)

(52) U.S. Cl.
  CPC ........... *B65D 1/0207* (2013.01); *B65D 23/10* (2013.01); *B29C 2949/077* (2022.05); *B29C 2949/0767* (2022.05); *B29C 2949/0791* (2022.05); *B29K 2067/003* (2013.01)

(58) Field of Classification Search
  CPC .. B65D 1/0207; B65D 23/10; B65D 21/0201; B65D 1/12; B65D 1/16; B65D 21/0209; B65D 49/06; B29C 49/0073; B29C 49/06; B29B 2911/144; B29B 2911/1442; B29B 2911/14513; B29K 2067/003
  See application file for complete search history.

(56) References Cited

U.S. PATENT DOCUMENTS

| | | | | |
|---|---|---|---|---|
| 4,369,598 A | * | 1/1983 | Beckwith | A01G 9/024 47/61 |
| 4,482,067 A | * | 11/1984 | Saito | B65D 23/001 206/509 |
| 4,512,493 A | * | 4/1985 | Von Holdt | B65D 43/0208 220/782 |
| 5,217,142 A | * | 6/1993 | Schutz | B65D 1/20 206/503 |
| 5,469,985 A | * | 11/1995 | Furuichi | B65D 7/045 206/509 |
| 6,230,892 B1 | | 5/2001 | Przytulla et al. | |
| 2013/0206762 A1 | | 8/2013 | Smith et al. | |
| 2013/0256180 A1 | * | 10/2013 | Smith | B65D 21/0215 206/509 |
| 2016/0039570 A1 | | 2/2016 | Meinzinger et al. | |
| 2016/0090215 A1 | | 3/2016 | Meinzinger | |
| 2018/0263408 A1 | * | 9/2018 | Malkin | A47J 31/52 |

FOREIGN PATENT DOCUMENTS

| | | |
|---|---|---|
| DE | 102009044314 A1 | 4/2011 |
| EP | 0177351 A2 | 4/1986 |
| EP | 0847929 A1 | 6/1998 |
| EP | 3000742 A1 | 3/2016 |
| GB | 1076035 A | 7/1967 |
| GB | 2016402 A | 9/1979 |
| GB | 2485555 A | 5/2012 |
| JP | S6193039 A | 5/1986 |
| JP | 2010228800 A | 10/2010 |

OTHER PUBLICATIONS

Intellectual Property Office, Combined Search and Examination Report Under Sections 17 and 18(3), Application No. GB1708093.8, dated Dec. 13, 2017, 8 pages.

* cited by examiner

Figure 1
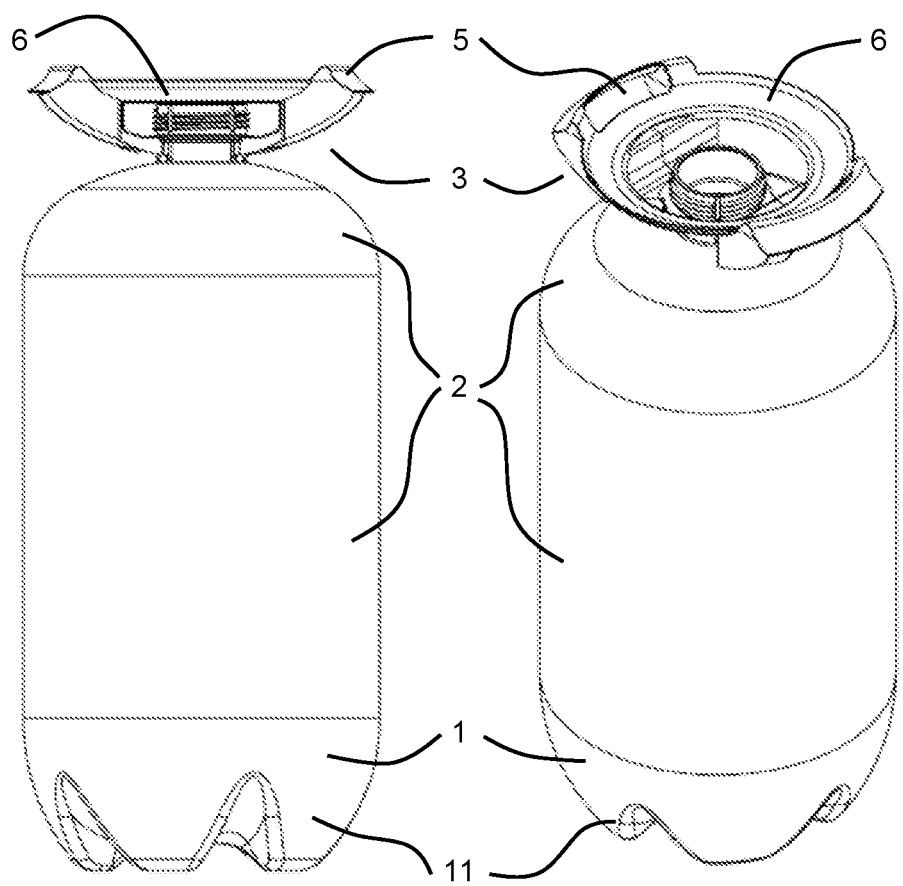
Fig. 1a            Fig. 1b
Figure 2
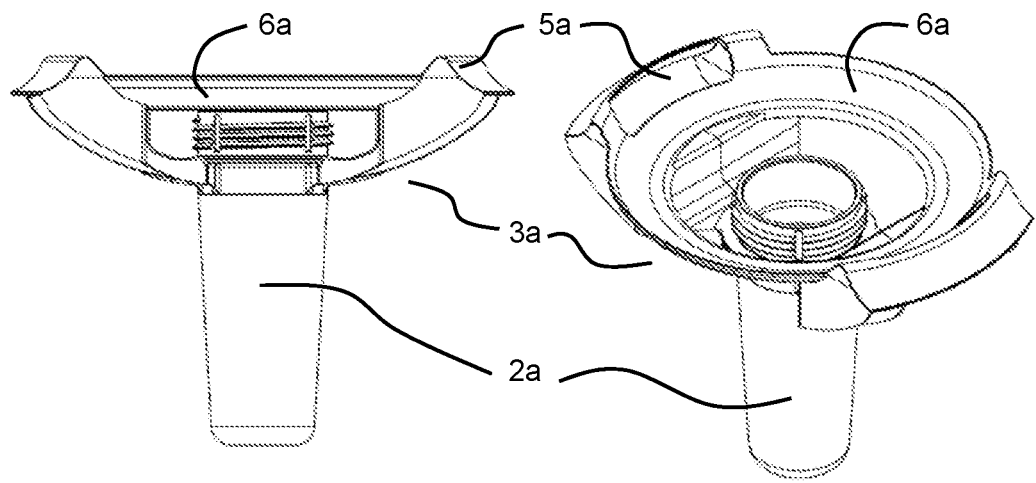
Fig. 2a            Fig. 2b Figure 3
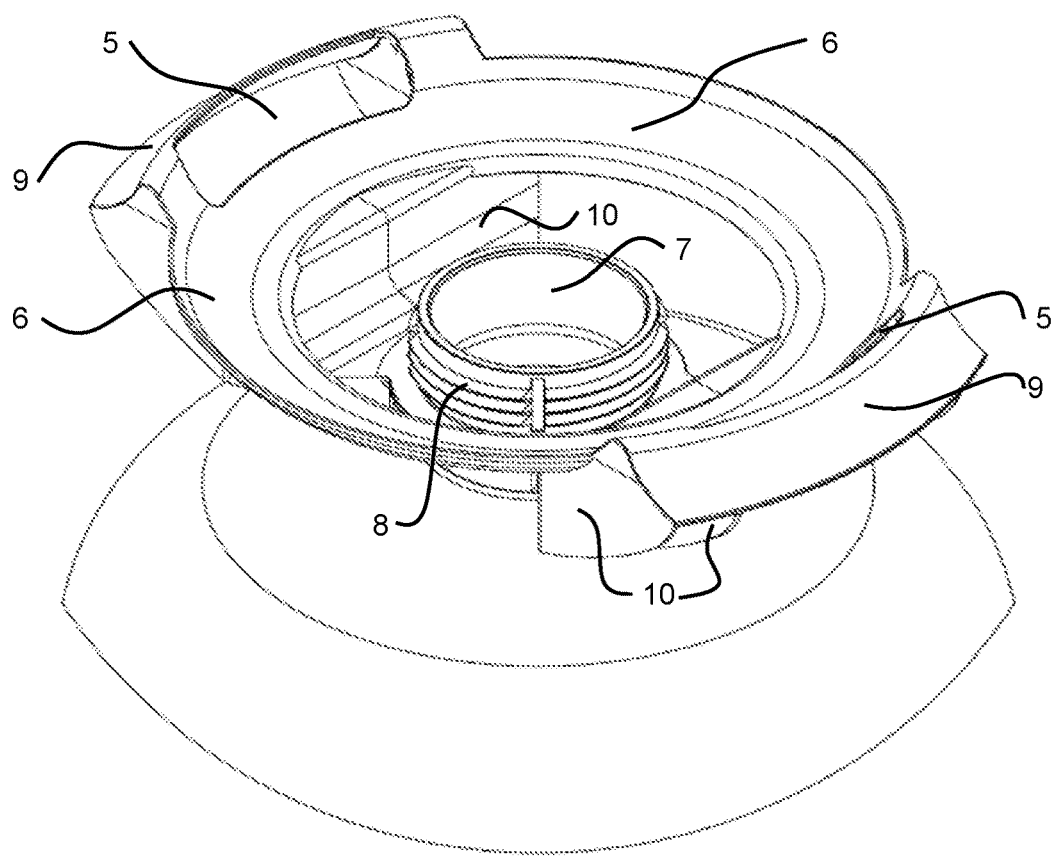
Figure 4
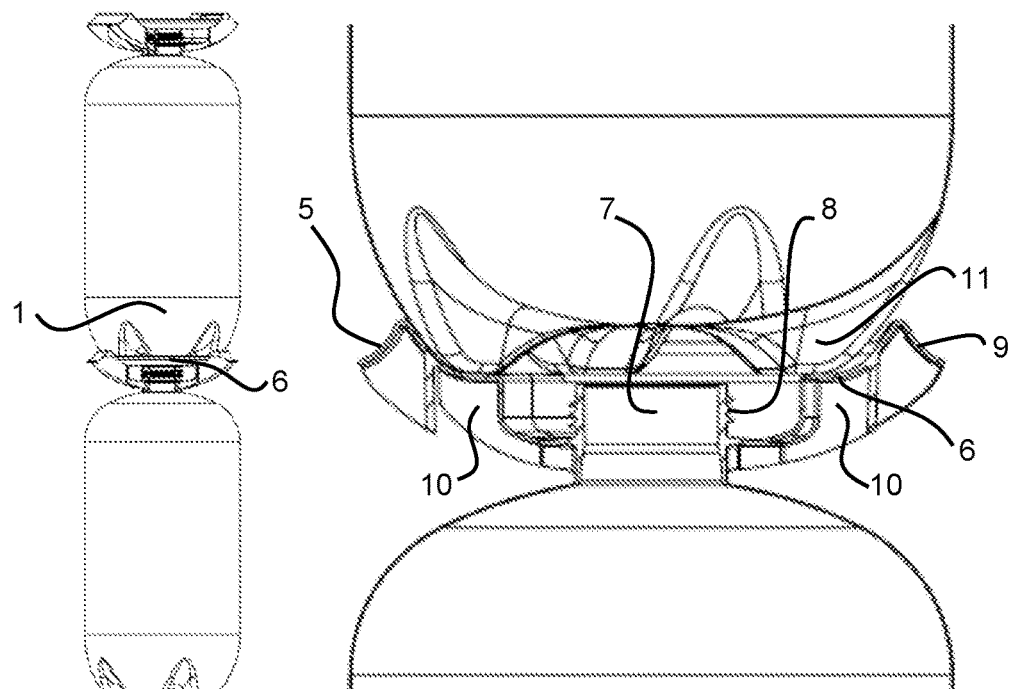
Fig. 4a Fig. 4b

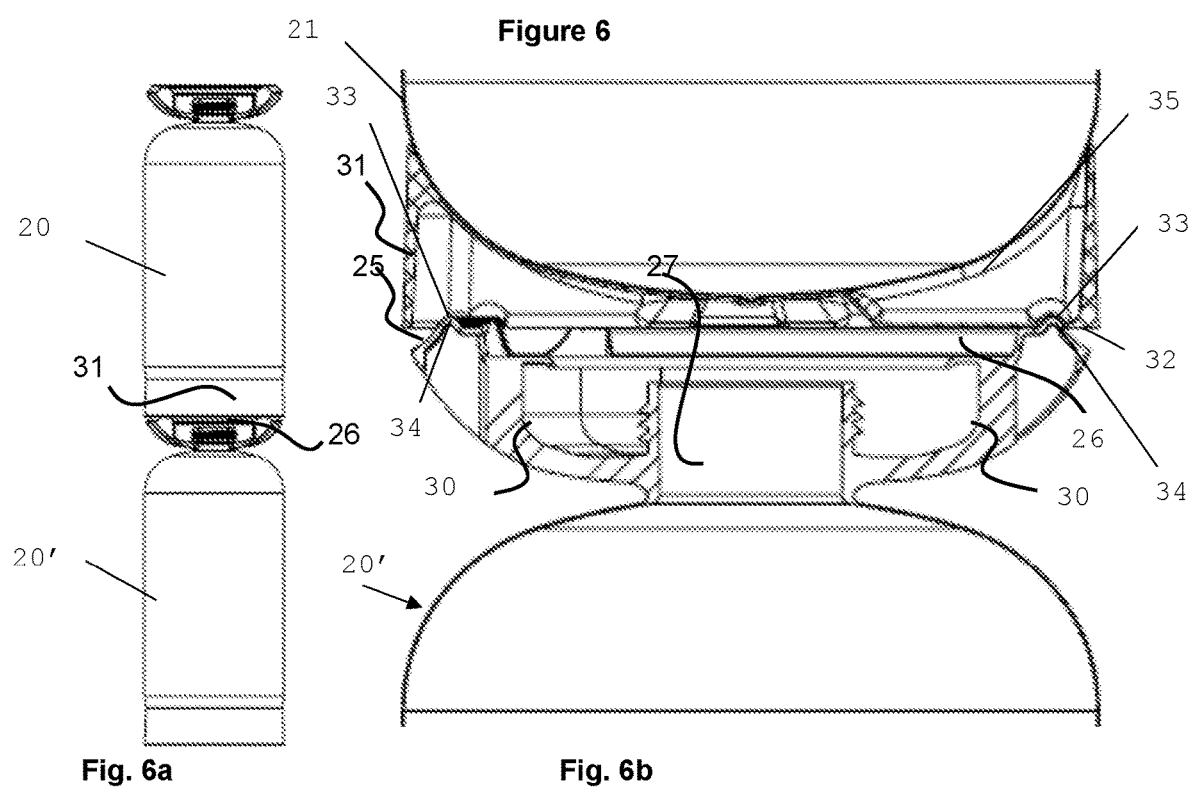

STACKABLE HOLLOW PLASTIC CONTAINER

CROSS-REFERENCE TO RELATED APPLICATIONS

This application represents the national stage entry of PCT International Application No. PCT/EP2018/054952 filed on Feb. 28, 2018 and claims priority to Great Britain Patent Application 1703164.2 filed on Feb. 28, 2017, and Great Britain Patent Application 1708093.8 filed May 19, 2017. The contents of these applications are hereby incorporated by reference as if set forth in their entirety herein.

FIELD

The present disclosure relates to hollow plastic containers for packing, storage and transport of fluids, with integrated handles for carrying and handling, as well as integrated chimes for stackability.

BACKGROUND

Stackable hollow plastic containers like jerry cans, are available with integrated handles for carrying and handling, and have shapes that allow them to be stackable one on top of each other for easier storage and transport. Such containers are widely used for packing liquids such as water, edible oils, and cleaning chemicals, which are not stored under pressure. For the cases where a product is packed under pressure, like carbonated beverages (e.g. beer), these available containers are not suitable, because their shape that provides stackability (usually cuboid or cylindrical with flat ends) is not suitable to withstand internal pressure.

For a plastic container to withstand the necessary internal pressure, its shape is restricted to being spherical or cylindrical with rounded ends, which does not allow for stackability. Furthermore, containers for packing products under pressure must be made from strong plastics like PET, otherwise they must be very heavy and, therefore, uneconomical. As a result, most plastic containers for pressurised packaging like beer kegs, are made from PET and have cylindrical shapes with rounded ends. Such containers are not stackable due to their shape, so in order to make them stackable for ease of storage and transport, they are either placed inside other containers like carton boxes or they are fitted with separately moulded parts (chimes and handles). The chimes are separate plastic parts that fit on the top of the containers and many times also at the bottom, and have shapes that allow the containers to be stacked on top of each other. Chimes usually include hollow parts that can be used as handles for carrying and handling the containers.

An example of prior art is DE102009044314A1 (KRONES AG), where the plastic container is fitted with two separately moulded parts, one at the base and one near the neck of the container, enabling stackability. Alternatively, to achieve stackability the container is placed inside another container, which is cylindrical and has a lid. The solution of having a top chime and a bottom chime is also offered by US2013206762A1 (Andrew Smith et al). Prior art with containers having petaloid-shaped bases (self-standing) and fitted with separately moulded chimes and handles around the neck area for handling and transport, can be found in GB2485555A (Silvia Romana Marabini) and US2016039570A1 (KRONES AG). Another example of prior art is U.S. Pat. No. 6,230,892B1 (Przytulla Dietmar [DE] et al), where the handle holes are opened by punching after moulding, while US2016/090215A1 (Meinzinger Rupert [DE]) discloses a container with a carrying element which can be adhered or snapped on.

There remains desire for containers including a handles and chimes, rendering them easy to carry, handle and stack but without adding substantially to the material cost and/or manufacturing complexity of the container.

SUMMARY

According to one aspect of the present disclosure, there is provided a stackable plastic container comprising a neck area, a body portion comprising a base; an integral handle part located around the neck area of the container, in which the handle part comprises one or more handles for carrying and handling the container; and an integral first chime configured to receive and/or cooperatively engage the base of an identical container.

Embodiments of the disclosure, therefore, may provide a plastic container which is produced with ready incorporated handles and chimes, rendering it easy to carry, handle and stack. Advantageously such a container may be provided without resorting to separately manufacturing additional parts and assembling them onto the container. Embodiments of the disclosure remove the need for separate chimes, handles, or other outer containers like cartons. A further advantage of embodiments of the disclosure may be in providing a container which is more easily recycled.

The container may comprise two spaced apart handles.

The integral first chime may be substantially annular in shape. For example, the integral first chime may be substantially ovaloid or circular in shape.

The or each handle(s) and integral first chime may be integrally moulded.

The or each handle and integral first chime may be located at or adjacent the neck area of the container.

The container may be formed from PET raw material.

The container may have any suitable number of handles. The or each handle may have any suitable shape, for example an oblong handle.

The container may comprise a single integrated moulding. The container may be formed in a two-step moulding process. For example, the container may be formed by injection moulding and stretch blow moulding. The or each handle(s) and integral first chime may be formed during an initial injection moulding step. The body portion may be formed into its final profile in a subsequent blow moulding process.

The handle(s) and the integral first chime may be integrally moulded. For example, the handle(s) and integral first chime may be provided by a single component of the container.

The integral first chime may be configured to provide one or more handle.

The body portion may comprise a dome shaped base or a petaloid base. The base may be a spherical or an elliptical base.

The term "petaloid-shaped base" is used herein to refer to a base having a substantially spherical or elliptical shape with three or more outwardly extending protrusions. The container may be a self-standing container comprising a body portion comprising a petaloid base. The base may be substantially spherical or elliptical in shape with three or more outwardly extending protrusions. Preferably, the base comprises five outwardly extending protrusions. The shapes and dimensions of the protrusions are designed to enable the container to withstand internal pressure.

The container may further comprise a second chime configured to receive at least the base of the body portion. The second chime may be configured to provide stability to the container. The second chime and the body portion may be separably formed or integrally formed. The second chime may be configured to receive a dome shaped base of the body portion. The container comprising the second chime is preferably self-standing. The second chime may be configured to aid stability of the container, and in particular to aid stability of the container having a dome shaped base, when transported on for example roller conveyors.

According to a further aspect of the present disclosure, there is provided a preform for a container as herein described, in which the preform comprises a neck area and a main preform body portion, in which the neck area comprises at least one handle and a chime.

According to a further aspect of the present disclosure, there is provided a method for producing a stackable plastic container as herein described, comprising the steps of:
    providing a preform comprising a neck area and a main preform body portion, in which the neck area includes at least one handle and an integral first chime, and
    blow moulding the main preform body portion to form the final container profile.

The step of providing a preform may for example comprise injection moulding a preform.

The step of blow moulding the preform body portion may comprise placing the preform within a blow mould at a predetermined temperature; and stretching and blowing the preform inside the blow mould into a container such that the neck area does not change during stretch blowing, while the main preform body portion is stretched and blown into the shape the container.

The method for producing the container may further comprise placing the base of the body portion of the container within a second chime configured to receive the base.

The container of embodiment of the disclosure is formed with at least one integral handle and at least one integral first chime incorporated as integral part so that the container is produced as one piece. As a result, there is no requirement for additional processing steps to separately produce handles, chimes or other outer containers and to attach such handles, chimes and outer containers to the container, thus saving resources and production costs.

The containers according to embodiments of the disclosure have the advantage that the handles and chimes on the produced containers can be very rigid for secure handling and stacking of bigger sized containers that are heavy when filled. The containers of the present disclosure may also be transported stably along for example a roller conveyor.

The containers of embodiments of the disclosure are economical because the weight of the container can be less than the corresponding weight of containers with separately moulded handles and chimes, thus saving raw material costs.

A further economic advantage of embodiments of the disclosure is the simplified manufacturing process, which eliminates separate production of several parts and the assembly of such parts.

Another advantage of the containers in accordance with embodiments of the disclosure is that unlike the containers with separate parts, usually made from different materials, the main container, the handles and the chimes are made as one piece from the same raw material, thus making them very easily recyclable.

In contrast to separately moulded handles and chimes, the integrally formed handle(s) and chimes of the containers of embodiments of the disclosure cannot detach from the container, adding to the safety of the container in use.

BRIEF DESCRIPTION OF THE DRAWINGS

The disclosure can be implemented in various ways and, by way of example only, specific embodiments thereof will now be described, reference being made to the accompanying drawings.

FIGS. 1a and 1b is a schematic illustration of the container according to one embodiment of the present disclosure in which the container comprises a petaloid-shaped base area, a main body and a neck area with integral handles and integral first chime;

FIGS. 2a and 2b is a schematic illustration of the preform according to one embodiment of the present disclosure which can be used to stretch blow mould the container of FIG. 1;

FIG. 3 is a schematic illustration of the integral handles and integral chime of the container according to FIG. 1;

FIGS. 4a and 4b are a schematic illustration of a stacked arrangement of two containers according to the embodiment of FIG. 1;

FIGS. 6a and 6b are schematic illustrations of stacked arrangements of the two containers according to the embodiment of FIGS. 5a and 5b.

DESCRIPTION

Figures 5, 5A, 5B:
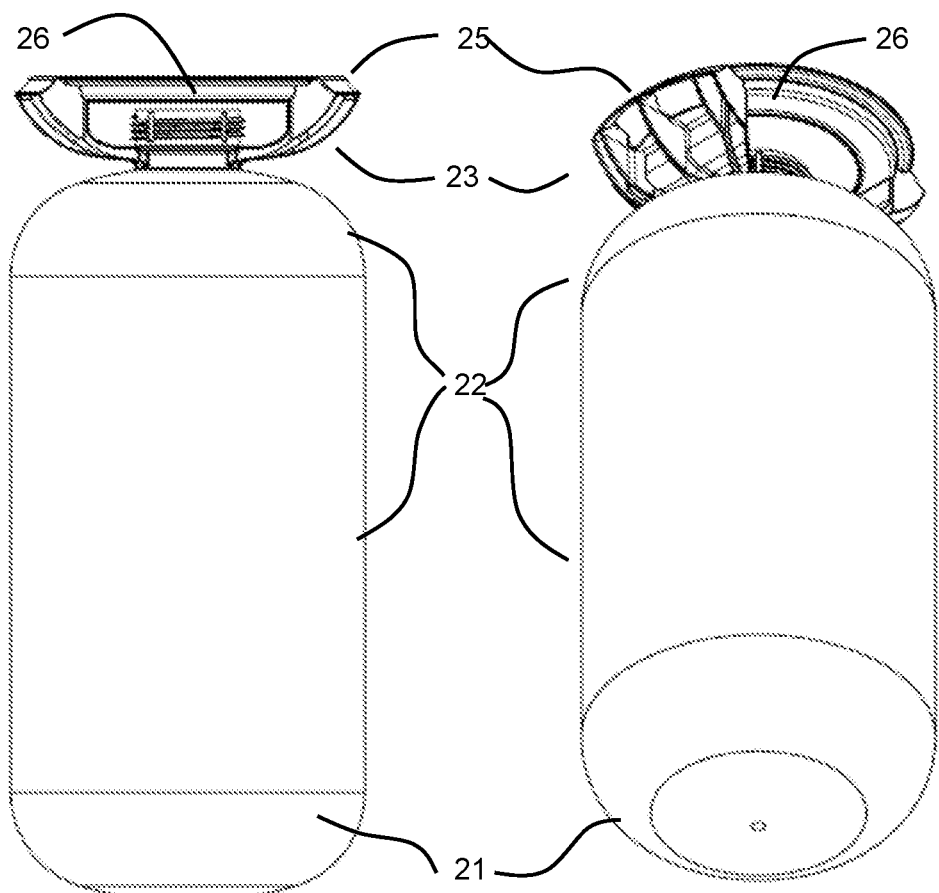
FIGS. 5a and 5b are a schematic illustration of the container according to a further embodiment of the present disclosure in which the container comprises a dome shaped base area, a main body and a neck area with integral handles and integral first chime.

In the arrangements described below by way of example, a container consists of a petaloid-shaped base area 1, a body portion 2 and a neck area 3. The corresponding preform has a main preform body portion 2a and a neck area 3a, which is the same as the neck area 3 of the container.

One such preferred arrangement is illustrated in FIG. 1, which illustrates in side (FIG. 1a) and isometric (FIG. 1b) views the overall shape of a container of the present disclosure, with a self-standing and stacking base area 1. The base area 1 is petaloid in shape. In particular, the base area 1 is substantially circular in shape with five outwardly extending protrusions 11. The container further comprises a body portion 2 in communication with a neck area 3. The neck area 3 provides an integral chime 6 and a pair of spaced apart integral handles 5. It can be seen from FIGS. 1a and 1b that the handles 5 and chime 6 are formed as a single integral component. The handles 5 are provided on opposite surfaces of the chime 6.

FIG. 2 illustrates in side (FIG. 2a) and isometric (FIG. 2b) views a shape of a preform that can be used to be stretch blow moulded to the container illustrated in FIG. 1. The neck area 3a of such a preform, including the integral handles 5a and integral chime 6a, will be the same as the corresponding neck area 3 of the container in FIG. 1, considering that the stretch blow moulding process does not affect the neck area of the preform. The main preform body 2a will be stretch blow moulded during the production of the containers, to form the base area 1 with the protrusions 11 and the body portion 2 of the container. The body portion has an expanded profile in comparison to the preform and typically expands from the neck to a generally rounded shoulder which is tapered towards a generally straight-sided section before reaching a base at the distal end of the container to the neck portion.

With reference to FIG. 3, it can be seen that in a preferred embodiment the neck area 3 of the container incorporates a screw threaded portion 8 for screw-type closures or dispensing valves. It is however to be understood that the neck area 3 may be designed with rings for push-on type closures or dispensing valves.

It can be seen from the Figures that the container and preform comprise two handles 5 with wide, curved surfaces 9 for comfort when carrying. It can also be seen that the container and preform comprise a substantially circular ring-shaped chime 6. The chime 6 is shaped to receive and cooperate with the base of an identically shaped container in such a way that one container can stack on another. The chime 6 on a first container is configured to support the protrusions 11 on the base of a second container positioned above the first container. It may be noted that the chime 6 has a generally concave upper surface profile which may help align the stacked containers. The handles and chime are each integrally connected at or adjacent to the neck opening 7 of the container, by supporting elements 10, which are designed to provide the required strength for carrying the weight of the containers stacked on top.

FIG. 4a is a side view of two containers stacked on top of each other, illustrating how the base area 1 of the container on top, co-operates with the chime 6 of the bottom container, to allow for stacking of the containers. FIG. 4a is a close-up sectional view, illustrating in more detail the features of the integrated chime 6 and handles 5 around the neck area 3 and neck opening 7 of the container, including the supporting elements 10 and the handle surfaces 9. This figure also illustrates the co-operation between the protrusions 11 of the base area 1, with the chime 6 of the container below.

FIGS. 5a and 5b illustrate a further embodiment of the container of the present disclosure. The container 20 consists of a dome shaped base 21, a body portion 22 and a neck area 23. The dome shaped base 21 is substantially spherical in shape. The neck area 23 provides an integral first chime 26 and a pair of spaced apart integral handles 25. It can be seen from FIGS. 5a and 5b that the handles 25 and the integral first chime 26 are formed as a single integral component. The handles 25 are provided on opposite surfaces of the first chime 26.

The container 20 further comprises a second chime (shown in FIG. 6) which is configured to receive the dome shaped base 21 of body portion 22 of the container 20. The second chime (not shown) is configured to receive the dome shaped base area 21 of the container 20 in order to provide sufficient support and stability to enable the container 20 together with the second chime (not shown) to be self-standing.

FIGS. 6a and 6b illustrate two containers 20, 20' of the embodiment illustrated in FIGS. 5a and 5b stacked on top of each other. FIGS. 6a and 6b illustrate how the dome shaped base 21 of body portion 22 of the upper container 20 is received within a second chime 31 to provide stability to the container 20'. The second chime 31 provides a recess 35 shaped and dimensioned to receive and engage the dome shaped base 21 of the upper container 20. The second chime 31 has a base 32 which provides an annular groove 33 which is shaped and dimensioned to receive and co-operate with the upper free surface of the integral first chime 26 of the bottom container 20' to allow for stable stacking of the containers 20, 20'. FIG. 6b is a close-up view, illustrating in more detail the co-operation between the annular groove 33 provided on the base 32 of the second chime 31 and the annular protrusion 34 provided on the upper free surface of the integral first chime 21 of the bottom container 20'. The annular protrusion 34 is shaped and dimensioned and located to be received within the annular groove 33 provided on the base 32 of the second chime 31 to provide a stable stacking configuration of the containers 20, 20'. Although the illustrated embodiment comprises a second chime 31 providing an annular groove 33 configured for releasable cooperation with an annular protrusion provided by the integral first chime 21, it is to be understood that the second chime 31 and first chime 21 may comprise any suitable engagement features to provide releasable co-operation between the first and second chimes and is not to be limited to an annular groove and an annular protrusion.

Although the disclosure has been described above with reference to preferred embodiments, it will be appreciated that various changes or modifications may be made without departing from the scope of the disclosure as defined in the appended claims.

The skilled person in the art will be appreciate from the above description that embodiments of the disclosure have been designed to take advantage of the injection stretch blow moulding process. Thus, the container may be an injection stretch blow moulded container. Specifically, embodiments of the disclosure form the chime and handle as part of a neck area during the injection moulding stage of the process so that they are not subsequently deformed during stretch blow moulding.

The skilled person will understand that the "neck" of an injection stretch blow moulded container may have a specific meaning. For example, the neck would generally be understood to be the constricted area between the shoulder (or body if the container does not have a shoulder area) and the opening of the container. The features of the neck are generally formed by injection moulding when the container is initially formed as a preform. The features of the neck are intentionally not deformed during the stretch blow moulding of the body of the container (which expands the body into its final shape) as they may, for example, include thread features.

In embodiments of the disclosure the handle and chime are formed at or adjacent to the neck opening, in other words they are not formed as part of the body portion of the container. By forming the chime and handle as part of the neck portion embodiments of the disclosure allow the chime and handle to be very rigid (in comparison for example to the body portion of the container) without the need to use a separate material or additional manufacturing steps to form the chime and handle. It will therefore be appreciated that an advantage of embodiments of the present disclosure is that the container remains a single integrated moulded product (in other words, the final product is formed from a single generally homogenous plastic component). This may be important, for example, in allowing for recycling and in reducing manufacturing requirements/costs.

The invention claimed is:

1. A stackable plastic container comprising a single integrated moulding including:
 a body portion comprising a base disposed at a distal end of the container; and
 a neck area comprising
  a neck opening disposed at a proximal end of the container;
  an integral handle part located at or adjacent the neck opening, in which the handle part comprises one or more handles for carrying and handling the container; and an integral first chime configured to receive and engage the base of an identical container, in which the integral first chime is configured to provide the one or more handles, wherein the container comprises a rounded shoulder area which constricts the neck area between the shoulder area and the neck opening, the shoulder tapering towards a straight-sided section of the body portion before reaching the base; and wherein the one or more handles and integral first chime are formed during an initial injection moulding step and wherein the body portion, including the shoulder area, is formed into its final profile in a subsequent blow moulding process.

2. A container as claimed in claim 1, in which the container comprises two spaced apart handles.

3. A container as claimed in claim 1, in which the integral first chime is substantially annular in shape.

4. A container as claimed in claim 1, in which the container is formed from PET raw material.

5. A container as claimed in claim 4, in which the container is formed in a two-step moulding process.

6. A container as claimed in claim 1, in which the body portion comprises a dome shaped base or petaloid base.

7. A container as claimed in claim 1, further comprising a second chime configured to receive at least the base of the body portion.

8. A container as claimed in claim 7, in which the second chime is configured to receive a dome shaped base of the body portion.

9. A container as claimed in claim 1, in which the container is self-standing.

10. A preform for a container as claimed in claim 1, wherein the preform comprises a neck area and a main preform body portion, in which the neck area comprises at least one handle and a chime.

11. A method for producing a stackable plastic container as claimed in claim 1, comprising the steps of:

providing a preform comprising a neck area and a main preform body portion, in which the neck area includes at least one handle and a chime; and blow moulding the main preform body portion to form the final container profile including the main body of the bottle and the shoulder area.

12. The method as claimed in claim 11, wherein the step of providing a preform comprises injection moulding a preform.

13. The method as claimed in claim 11, wherein the step of blow moulding the preform body portion comprises placing the preform within a blow mould at a predetermined temperature; and stretching and blowing the preform inside the blow mould into a container such that the neck area does not change during stretch blowing while the main preform body portion is stretched and blown into the shape the container.

14. A method as claimed in claim 11, further comprising placing the base of the body portion of the container within a second chime configured to receive the base.

* * * * *